United States Patent [19]

Goldenberg

[11] Patent Number: 5,303,421
[45] Date of Patent: Apr. 12, 1994

[54] METHOD AND APPARATUS FOR COUPLING STRAPS OF A WRIST WORN DEVICE

[75] Inventor: Michael P. Goldenberg, Boynton Beach, Fla.

[73] Assignee: Motorola, Inc., Schaumburg, Ill.

[21] Appl. No.: 842,676

[22] Filed: Feb. 27, 1992

[51] Int. Cl.⁵ .............................................. H04B 1/08
[52] U.S. Cl. ...................................... 455/344; 455/90; 455/274; 455/351; 24/265 WS
[58] Field of Search ................... 455/89, 90, 274, 280, 455/347, 348, 349, 351, 344; 343/718, 720; 368/10, 282; 24/265 WS, 600.9, 71 J, 265 B, 265 R

[56] References Cited

U.S. PATENT DOCUMENTS

| | | | |
|---|---|---|---|
| 4,586,827 | 5/1986 | Hirsch et al. | 455/351 |
| 4,713,808 | 12/1987 | Gaskill et al. | 370/94 |
| 4,847,818 | 7/1989 | Olsen | 455/89 |
| 4,922,260 | 6/1990 | Gaskill et al. | 455/351 |
| 4,977,614 | 12/1990 | Kurcbart | 455/351 |
| 5,134,724 | 7/1992 | Gehring et al. | 455/344 |
| 5,159,713 | 10/1992 | Gaskill et al. | 455/351 |
| 5,179,733 | 1/1993 | Matsui | 455/351 |

OTHER PUBLICATIONS

"The Wrist Watch Pager" Series, Numeric Display Pagers, 138-174 MHz Service Manual, 6881011B10-O, 1990 by Motorola, Inc.

*Primary Examiner*—Reinhard J. Eisenzopf
*Assistant Examiner*—Nguyen Vo
*Attorney, Agent, or Firm*—Keith A. Chanroo; Thomas G. Berry; Daniel R. Collopy

[57] ABSTRACT

A selective call receiver (100) including a receiver (102) for receiving messages and a housing (104) for housing the receiver (102). A clasp (200) for securing first and second wrist straps (112, 114) including a base member (202) and a pair of sides (204, 206) contiguous with the base member (202). A first compression member (208) located between the pair of sides (204, 206), the base member (202) and the first compression member (208) for engaging the first wrist strap (112) slidably therebetween. The first wrist strap (112) is also coupled to the housing (104). A clasp cover (214) having a second compression member (210) coupled thereto and to a first (204) of the pair of sides. The second compression member (210) engages the second wrist strap (114) with the first compression member (208) when the clasp cover (212) is transversely rotated between the pair of sides (204, 206) while the second wrist strap (114) also coupled to the housing (104).

14 Claims, 2 Drawing Sheets

METHOD AND APPARATUS FOR COUPLING STRAPS OF A WRIST WORN DEVICE

FIELD OF THE INVENTION

This invention relates in general to coupling devices, and more specifically to a coupling device for coupling straps of a wrist worn device.

BACKGROUND OF THE INVENTION

Throughout the years, selective call receivers have reduced significantly in size. This reduction was made possible by numerous advances in integrated circuit (IC) and leadless components technologies, which are partly responsible for contemporary miniature receivers. However, this miniaturization in electrical receivers has placed a severe demand on the mechanical components. That is, the materials and the methods of coupling the mechanical parts together must be more stress resistant.

For example, consider the increased stress placed upon an antenna of a wrist watch selective call receiver (e.g., wrist watch pager) that is substantially disposed within a wrist strap, and especially a coupling to the antenna. During normal operation, the watch wrist strap must be flexible and movable while contemporaneously maintaining the electrical contact between both sections of the antenna forming a "closed-loop" path. Previous methods of coupling the antenna sections together generally require at least one section of the antenna to be rigidly fixed to a clasp. However, constant use and movements cause excessive stress build-up at the fixed points. The stress build-up can eventually result in a separation from the antenna resulting in an open circuit between the receiver and the antenna.

Generally, this coupling is substantially cumbersome for users and repair personnel who must remove and replace the antenna/watch band assembly. Thus, what is needed is a method of coupling an antenna within a wrist strap to a clasp that reduces stress build-up during use, while maintaining an electrical contact to provide the "close-loop" path.

SUMMARY OF THE INVENTION

A clasp for securing first and second wrist straps comprising a base member and a pair of sides contiguous to the base member. A first compression member located between the pair of sides, the base member and the first compression member for engaging the first wrist strap slidably therebetween. A clasp cover including a second compression member coupled thereto and to a first of the pair of sides. The second compression member for engaging the second wrist strap with the first compression member when the clasp cover is transversely rotated between the pair of sides.

DESCRIPTION OF A PREFERRED EMBODIMENT

Figure 1:
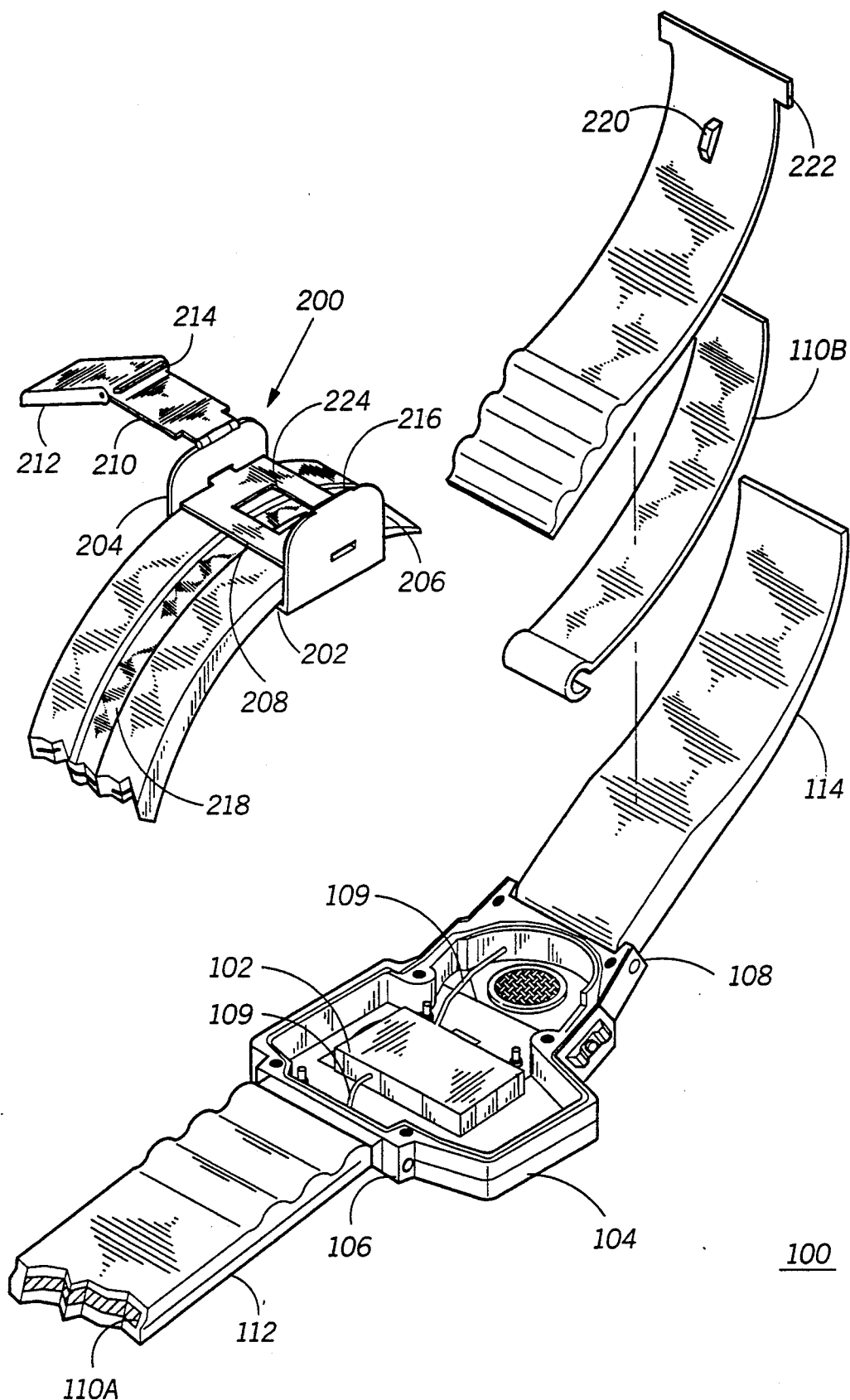
FIG. 1 is an isometric representation of a wrist watch selective call receiver having a clasp for coupling first and second wrist straps in accordance with the preferred embodiment of the present invention.

Referring to FIG. 1, an isometric representation of a selective call receiver 100 (e.g., a wrist watch pager) is shown in accordance with the present invention. The operation of the selective call receiver 100 is well known to those skilled in the art. According to the preferred embodiment of the present invention, the selective call receiver 100 comprises a receiver 102 of conventional design enclosed within a housing enclosure 104. The receiver 102 is coupled (109) to a first and second antenna sections 110A, 110B, and when the first and second antenna sections 110A, 110B are closed to form a "close-loop". The resulting "closed-loop" antenna is now capable of receiving radio frequency (RF) signals which are processed by the receiver as is well known to those of ordinary skill in the art. The housing enclosure 104 has a first and second portions 106, 108 for coupling to a first and second wrist straps 112, 114, respectively. The second wrist strap 114 is shown as an exploded view to illustrate the second antenna section 110B embedded within the second wrist strap 114. A first antenna section 110A is similarly incorporated within the first wrist strap 112. A clasp 200 is shown coupled to the first wrist strap 112 for coupling the first and second wrist straps 112, 114 together. The clasp 200 comprises a base member 202 with a pair of sides 204, 206 contiguous to the base member 202. A first compression member 208 is located between the pair of sides 204, 206 and provides an opening between the base member 202, the pair of sides 204, 206 and the first compression member 208 for slidably engaging with the first wrist strap 112. A second compression member 210 is rotatably coupled to a first side 204 of the pair of sides. The opposite end of the second compression member 210 is also rotatably coupled to a clasp cover 212 which together are transversely rotated between the pair of sides 204, 206. The clasp cover 212 (when engaged) is coupled to a catch 214 which engages with a locking means 216, preferably including a hook, which is coupled to a second side 206 of the pair of sides.

Operationally, the clasp 200 is slidably coupled to the first wrist strap 112 by sliding the first wrist strap 112 through the opening between the base member 202 and the first compression member 208. Preferably, the first wrist strap 112 is tapered at the end to facilitate easier coupling to the clasp 200. The clasp 200 is then positioned at a user preferred location to facilitate a proper fit, for example, on the user's wrist. When positioned, the first compression member 208 and the base member 202 provide sufficient compressive force to prevent the clasp 200 from shifting on the first wrist strap 112 but insufficient to permit the user to adjust the position of the clasp 200 on the first wrist strap 112. As is further shown, the first compression member 208 has a contact port (or a slot) 224 for enabling an electrical coupling between the first and second antenna sections 110A, B. To facilitate the electrical coupling, the first wrist strap 112 comprises a contact strip recess 218 which is preferably centrally located on the first wrist strap 112 and along a length of the wrist strap 112. The contact strip recess 218 provides an access to the first antenna section 110A embedded in the first wrist strap 112. However, the contact strip recess 218 of the first wrist strap could be replaced with discrete openings (e.g., holes) for facilitating discrete positioning of the clasp on the first wrist strap. In this way, the clasp 200, when fitted to the first wrist strap 112, automatically aligns with the contact recess strip 218 for maintaining the electrical coupling thereto.

The second wrist strap 114 has a protruding contact 220 which is electrically coupled to the second antenna section 110B, and a notch 222 to resist dislocation of the second wrist strap from the clasp 200 when coupled thereto. When the second wrist strap 114 is positioned within the clasp 200, the protruding contact 220 makes an electrical coupling with the contact strip recess 218 by locating the protruding contact 220 through the contact port 224. Alternatively, the protruding contact 220 can be coupled to the second antenna section 110B with an opening in the second wrist strap 114 to enable the electrical coupling to the contact strip 218 of the first antenna sections 112. In this manner, the electrical coupling between the first and second antenna sections 110A, B forms the "closed-loop" necessary for receiving the RF signals. Then by transversely rotating the second compression member 210 and the clasp cover 212 to the second side 206 causes the second compression member 210 to contact with the second wrist strap 114 (already positioned in the clasp 200) compressing the second wrist strap 114 against the first compression member 208. The clasp cover 212 is then coupled or locked via the catch 214 and the hook 216 on the second side 206. Unlike the prior art clasp assemblies, the electrical coupling of the first and second antenna sections is accomplished without any electrical coupling through the various parts of the clasp. That is, since the clasp is not electrically coupled to the antenna, touching the clasp does not detune or interfere with the electrical circuit of the selective call receiver.

Thus, the second wrist strap 114, when so compressed between the first and second compression members 208, 210, resists the dislocating forces and provides an effective electrical coupling between the first and second antenna sections 110A, B. The notch 222 on the second wrist strap 114 provides additional resistance against dislocating forces while providing a guide for coupling the protruding contact 220 to the contact recess strip 218 via the contact port 224. Furthermore, the catch on the clasp cover 212 couples with the hook 216 on the second side while the second compression member 210 and the clasp cover 212 forms an over-center mechanism known to those skilled in the art for resisting forces from separating the catch 214 from the hook 216.

Figure 2:
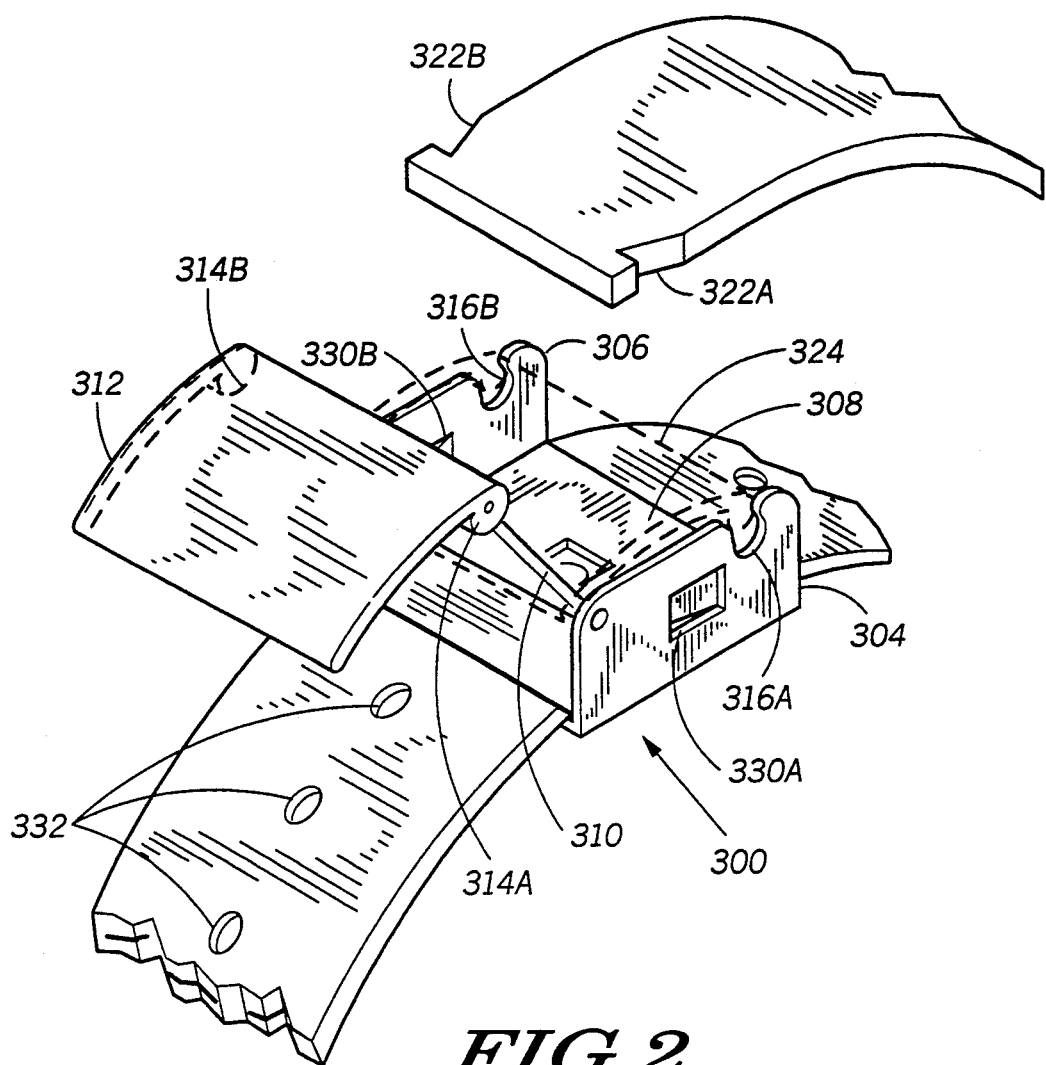
FIG. 2 is an isometric representation of a second embodiment of the clasp in accordance with the present invention.

Referring to FIG. 2, an isometric representation of a second embodiment of the clasp in accordance with the present invention is shown. Generally, the second embodiment of the clasp 300 is similar to the preferred embodiment shown in FIG. 1 but for the following differences. The second compression member 310 and the clasp cover 312 are parallel to and rotatably coupled between the pair of sides 304, 306. The pair of sides have opposite but matching locators 330A, B for coupling with notches 322A, B of the second wrist strap. The pair of sides 304, 306 each has a recess portion forming a pair of hooks 316A, B. The clasp cover 312 has two matching catches 314A, B for engaging with the hooks 316A, B of the pair of sides 304, 306, respectively. The first wrist strap is shown with discrete holes 332 for facilitating discrete positioning of the clasp on the first wrist strap. When the catches 314A, B engage with the hooks 316A, B as shown by the phantom lines 324, the "over-center mechanism" thus formed causes sufficient force to prevent the coupling therebetween from being dislodged.

Operationally, rotating the second compression member 310 and the clasp cover 312 between the pair of sides 304, 306 causes the second compression member 310 to contact with the second wrist strap (already positioned in the clasp 300), and compressing the second wrist strap against the first compression member 308. The clasp cover 312 is then coupled or locked via the catches 314A, B and the hooks 316A, B, respectively (as shown with phantom lines 324). In this way, the second wrist strap is compressed between the first and second compression members 308, 310 for resisting dislocating forces and for providing an effective electrical coupling between the first and second antenna sections. The notches 322A, B further resist any dislocating forces and provide a guide for making a proper electrical coupling.

Figure 3:
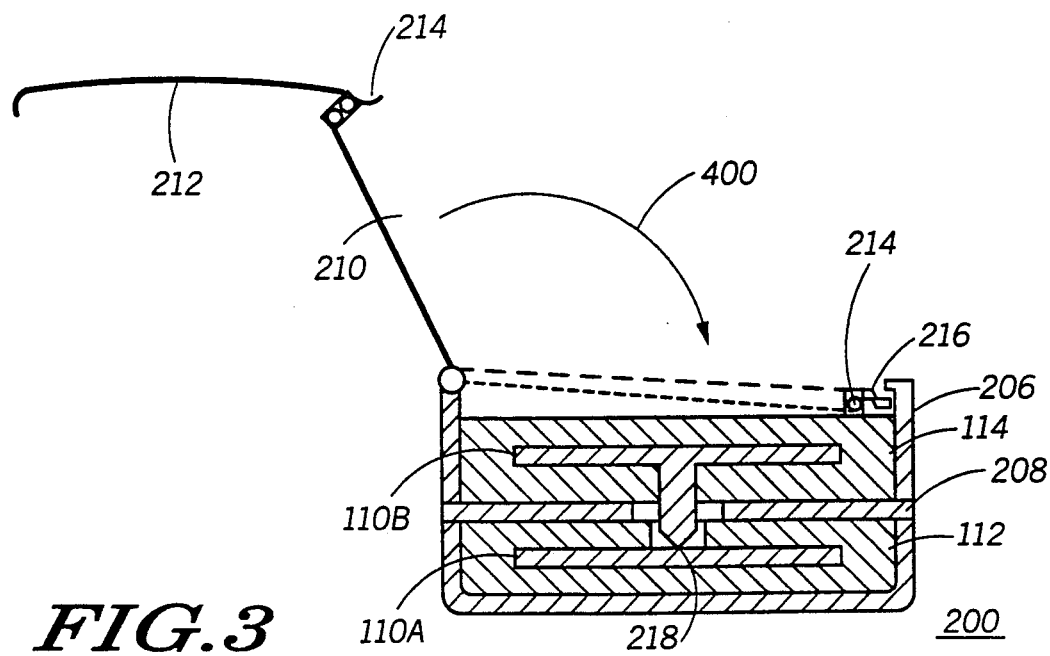
FIG. 3 is a cross-sectional view of the clasp in accordance to the preferred embodiment of FIG. 1.

FIG. 3 shows a cross-sectional view of the clasp 200 in accordance to the preferred embodiment. The cross-sectional view includes the first and second wrist straps 112, 114 positioned in the clasp 200 for providing the electrical coupling between the first and second antenna sections 110A, B. The second compression member 210 and the clasp cover 212 are shown uncoupled with the directional arrow 400 illustrating the motion for coupling the second compression member 210 and the catch 214 of the clasp cover 212 with the hook 216 on the second side 206 (shown by the phantom lines). When coupled, the second compression member 210 contacts with the second wrist strap 114 compressing it to the first compression member 208 to enable the electrical contact 218 and to resist dislocation to the second strap 114 from the clasp 200.

In summary, a selective call receiver includes a clasp for securing first and second wrist straps comprising a base member and a pair of sides contiguous with the base member. A first compression member located between the pair of sides, the base member and the first compression member for engaging the first wrist strap slidably therebetween. A clasp cover includes a second compression member coupled thereto and to a first of said pair of sides. The second compression member engages the second wrist strap with the first compression member when the clasp cover is transversely rotated between the first and second pair of sides. The second wrist strap when compressed between the first and second compression members resists the dislocating forces and provides an effective electrical coupling between the first and second antenna sections. The notch on the second wrist strap also resists any dislocating forces and provides a guide for coupling the protruding contact to the contact recess strip via the contact port. Furthermore, the catch on the clasp cover couples with the hook on the second side while the second compression member and the clasp cover 212 provide an over-center mechanism known to those skilled in the art to resist forces from separating the catch and the hook.

I claim:

1. A clasp for securing first and second wrist straps, comprising:
    a base member;
    a pair of sides contiguous with said base member;
    a first compression member located between and coupled to said pair of sides;

said base member and said first compression member coupled with the pair of sides engage the first wrist strap slidably therebetween;

a clasp cover including a second compression member coupled thereto, the clasp cover being transversely coupled to a first of said pair of sides for rotating between the pair of sides; and said second compression member engages and compresses the second wrist strap between said first and second compression members when said clasp cover is transversely rotated between said pair of sides.

2. The clasp according to claim 1 further includes a catch which engages with a locking means on a second of said pair of sides when said clasp cover is transversely rotated between said pair of sides.

3. The clasp according to claim 2 wherein said locking means is a hook.

4. The clasp according to claim 1 wherein said first wrist strap includes a first antenna section and said second wrist strap includes a second antenna section, and wherein said first compression member includes a contact port to enable electrical contact between said first and second antenna sections.

5. The clasp according to claim 4 wherein the first wrist strap includes a contact strip recess along a length of said first wrist strap to enable the electrical contact between said first and said second antenna sections via the contact port.

6. A selective call receiver, comprising:
   a receiver for receiving messages;
   a housing for housing said receiver;
   first and second wrist straps coupled to said housing for securing the selective call receiver to a user;
   a clasp for securing said first and second wrist straps, the clasp comprising:
      a base member;
      a pair of sides contiguous with said base member;
      a first compression member located between and coupled to said pair of sides;
      said base member and said first compression member coupled with the pair of sides engage the first wrist strap slidably therebetween, said first wrist strap coupled to said housing;
   a clasp cover including a second compression member coupled thereto, the clasp cover being transversely coupled to a first of said pair of sides for rotating between the pair of sides; and
   said second compression member engages and compresses the second wrist strap between said first and second compression members when said clasp cover is transversely rotated between said pair of sides, said second wrist strap coupled to the housing.

7. The selective call receiver according to claim 6 wherein the clasp cover includes a catch which engages with a lock on a second of said pair of sides when said clasp cover is transversely rotated between said pair of sides.

8. The selective call receiver according to claim 7 wherein said lock comprises a hook.

9. The selective call receiver according to claim 6 wherein said first wrist strap includes a first antenna section and said second wrist strap includes a second antenna section, and wherein said first compression member includes a contact port to enable electrical contact between said first and second antenna sections.

10. The selective call receiver according to claim 9 wherein the first wrist strap includes a contact strip recess along a length of said first wrist strap to enable the electrical contact between said first and said second antenna sections via the contact port.

11. A method for coupling a first wrist strap and a second wrist strap, comprising the steps of:
   (a) slidably engaging said first wrist strap with a clasp having a base member, a first compression member and a pair of sides wherein said first wrist strap is slidably engaged between the pair of sides and between the base member and the first compression member;
   (b) coupling said second wrist strap between said pair of sides of said clasp;
   (c) transversely rotatably coupling a clasp cover having a second compression member transversely coupled to a first of said pair of sides;
   (d) engaging said second compression member with the second wrist strap for transversely rotating between said pair of sides.

12. The method according to claim 11 wherein step (d) includes the step of locking the clasp cover to the second of said pair of sides having a lock.

13. The method according to claim 11 wherein step (d) includes electrically coupling a first and second antenna sections contained within said first and second wrist straps.

14. A selective call receiver, comprising:
   a receiver for receiving messages;
   a housing for housing said receiver;
   first and second wrist straps coupled to said housing for securing the selective call receiver to a user, the first wrist strap includes a first antenna section and the second wrist strap includes a second antenna section;
   a clasp for securing said first and second wrist straps including the first and second antenna sections coupled to said receiver, the clasp comprising:
      a base member;
      a pair of sides contiguous with said base member;
      a first compression member located between and coupled to said pair of sides, said first compression member includes a contact port to enable electrical contact between said first and second antenna sections;
      said base member and said first compression member coupled with the pair of sides engage the first wrist strap slidably therebetween, said first wrist strap coupled to said housing and includes a contact strip recess along a length of said first wrist strap to enable the electrical contact between said first and said second antenna sections via the contact port;
   a clasp cover including a second compression member transversely coupled thereto, the clasp cover being transversely coupled to a first of said pair of sides for rotating between the pair of sides;
   said second compression member engages and compresses the second wrist strap between said first and second compression members when said clasp cover is transversely rotated between said pair of sides thereby electrically coupling said first and second antenna sections; and
   a catch coupled to said clasp cover for engaging with a lock coupled to a second of said pair of sides for securing the first and second wrist straps.

* * * * *